(12) United States Patent
Wadeyar et al.

(10) Patent No.: US 11,720,159 B2
(45) Date of Patent: Aug. 8, 2023

(54) UNIFIED BUS ARCHITECTURE FOR A VOLTAGE REGULATOR

(71) Applicant: TEXAS INSTRUMENTS INCORPORATED, Dallas, TX (US)

(72) Inventors: Venkatesh Wadeyar, Bengaluru (IN); Vikas Lakhanpal, Bengaluru (IN); Preetam Charan Anand Tadeparthy, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/917,423

(22) Filed: Jun. 30, 2020

(65) Prior Publication Data
US 2021/0004072 A1 Jan. 7, 2021

(30) Foreign Application Priority Data
Jul. 1, 2019 (IN) .............................. 201941026259

(51) Int. Cl.
*G06F 1/28* (2006.01)
*G06F 13/42* (2006.01)

(52) U.S. Cl.
CPC ............ *G06F 1/28* (2013.01); *G06F 13/4282* (2013.01)

(58) Field of Classification Search
CPC ........ G06F 1/3296; G06F 1/26; G06F 1/3203; G06F 1/324; G06F 1/28; G06F 1/3287; G06F 1/3206; G06F 1/266; G06F 1/04; G06F 2119/06; G06F 1/206; G06F 1/3243; G06F 1/3265; G06F 1/30; G06F 1/32; G06F 9/46; G06F 1/3234; G06F 1/3293; G06F 30/36; G06F 1/305; G06F 1/325; G06F 1/3275; G06F 1/3253; G06F 1/3262; Y02D 10/00
USPC ....... 713/300, 320, 322, 340, 600, 100, 323, 713/324, 330
See application file for complete search history.

(56) References Cited

U.S. PATENT DOCUMENTS

| | | | | |
|---|---|---|---|---|
| 5,666,116 | A * | 9/1997 | Bakhmutsky | H03M 7/425 341/67 |
| 8,412,976 | B2 * | 4/2013 | Kraipak | G06F 13/4291 713/600 |
| 9,164,939 | B2 * | 10/2015 | Lui | H03K 19/17752 |
| 2002/0122407 | A1 * | 9/2002 | Molnar | H04L 1/0045 370/347 |
| 2004/0125807 | A1 * | 7/2004 | Liu | H04L 69/167 370/395.32 |
| 2008/0229093 | A1 * | 9/2008 | Butts | G06F 15/16 713/100 |
| 2011/0006807 | A1 * | 1/2011 | Schneiderwind | G06N 7/08 326/39 |
| 2011/0066920 | A1 * | 3/2011 | Yu | G06F 11/1064 711/E12.008 |
| 2012/0054502 | A1 * | 3/2012 | Chueh | G06F 1/26 713/300 |
| 2014/0123284 | A1 * | 5/2014 | Liu | G06F 21/566 726/23 |

(Continued)

*Primary Examiner* — Faisal M Zaman
(74) *Attorney, Agent, or Firm* — Valerie M. Davis; Frank D. Cimino

(57) ABSTRACT

In described examples, a voltage regulator includes a processor. A register bank is coupled to the processor. A logic block is coupled to the processor and to the register bank. The logic block receives frames. The processor programs the logic block and the register bank based on at least one of the frames.

17 Claims, 6 Drawing Sheets

(56) References Cited

U.S. PATENT DOCUMENTS

| | | | |
|---|---|---|---|
| 2014/0380070 A1* | 12/2014 | Hua | G06F 1/3296 |
| | | | 713/320 |
| 2015/0334033 A1* | 11/2015 | Wang | H04L 69/04 |
| | | | 370/389 |
| 2016/0070335 A1* | 3/2016 | Mitrea | G06F 1/3243 |
| | | | 713/323 |
| 2016/0085547 A1* | 3/2016 | Memon | G06F 9/30032 |
| | | | 712/208 |
| 2016/0209905 A1* | 7/2016 | Kelly | G06F 1/3206 |
| 2017/0123987 A1* | 5/2017 | Cheng | G06F 15/7821 |
| 2017/0300398 A1* | 10/2017 | Luo | G06F 1/26 |
| 2018/0088647 A1* | 3/2018 | Suryanarayanan | G06F 1/26 |
| 2018/0173667 A1* | 6/2018 | Mishra | G06F 1/3293 |
| 2018/0356848 A1* | 12/2018 | Hu | G06F 1/26 |
| 2019/0188165 A1* | 6/2019 | Venkatraman | G06F 13/362 |
| 2019/0286605 A1* | 9/2019 | Harriman | G06F 13/42 |
| 2019/0384951 A1* | 12/2019 | Stiglic | G06K 7/10297 |
| 2020/0201408 A1* | 6/2020 | Lehwalder | G05B 23/0235 |

* cited by examiner

UNIFIED BUS ARCHITECTURE FOR A VOLTAGE REGULATOR

CROSS-REFERENCE TO RELATED APPLICATION

This application claims priority to India provisional patent application no. 201941026259, filed Jul. 1, 2019, which is hereby incorporated by reference in its entirety.

TECHNICAL FIELD

This description relates generally to voltage regulators, and more particularly to a unified bus architecture for communication between electronic components.

BACKGROUND

In a power management system, a processing unit communicates with a voltage regulator through a high speed serial interface (HSSI). Based on its power needs, the processing unit dynamically controls multiple parameters of the voltage regulator, such as output voltage, slew rates and power states through the HSSI. Also, the processing unit monitors the voltage regulator for critical events, faults and telemetry information through the HSSI. The HSSI is also referred as power bus interface or power bus architecture. The specifications for the HSSI are defined by respective processing unit manufacturers.

Examples of the industry standard protocols for high speed serial interface include SVID (Serial Voltage Identification), SVI (Serial Voltage Identification Interface) and AVS (Adaptive Voltage Scaling). Those protocols are useful in various power management systems based on compatibility of the processing unit. The power management system for various application segments (such as server, storage, communication, automotive, personal computer and gaming) uses an appropriate processing unit.

In an end application of a power management system, the voltage regulator is designed for a single standard protocol for high speed serial interface based on the processing unit compatibility and the application segment. This severely limits the usage of the voltage regulator. The voltage regulator is not adaptable to any changes in the specification of the standard protocol. For example, if in the specification of a standard protocol, changes are made to commands, registers or new commands and registers are added, the voltage regulator would not respond to such modifications. Another drawback is that the voltage regulator provides no support to multiple standard protocols and to multiple application segments.

SUMMARY

In described examples, a voltage regulator includes a processor. A register bank is coupled to the processor. A logic block is coupled to the processor and to the register bank. The logic block receives frames. The processor programs the logic block and the register bank based on at least one of the frames.

DETAILED DESCRIPTION OF EXAMPLE EMBODIMENTS

Figure 1:
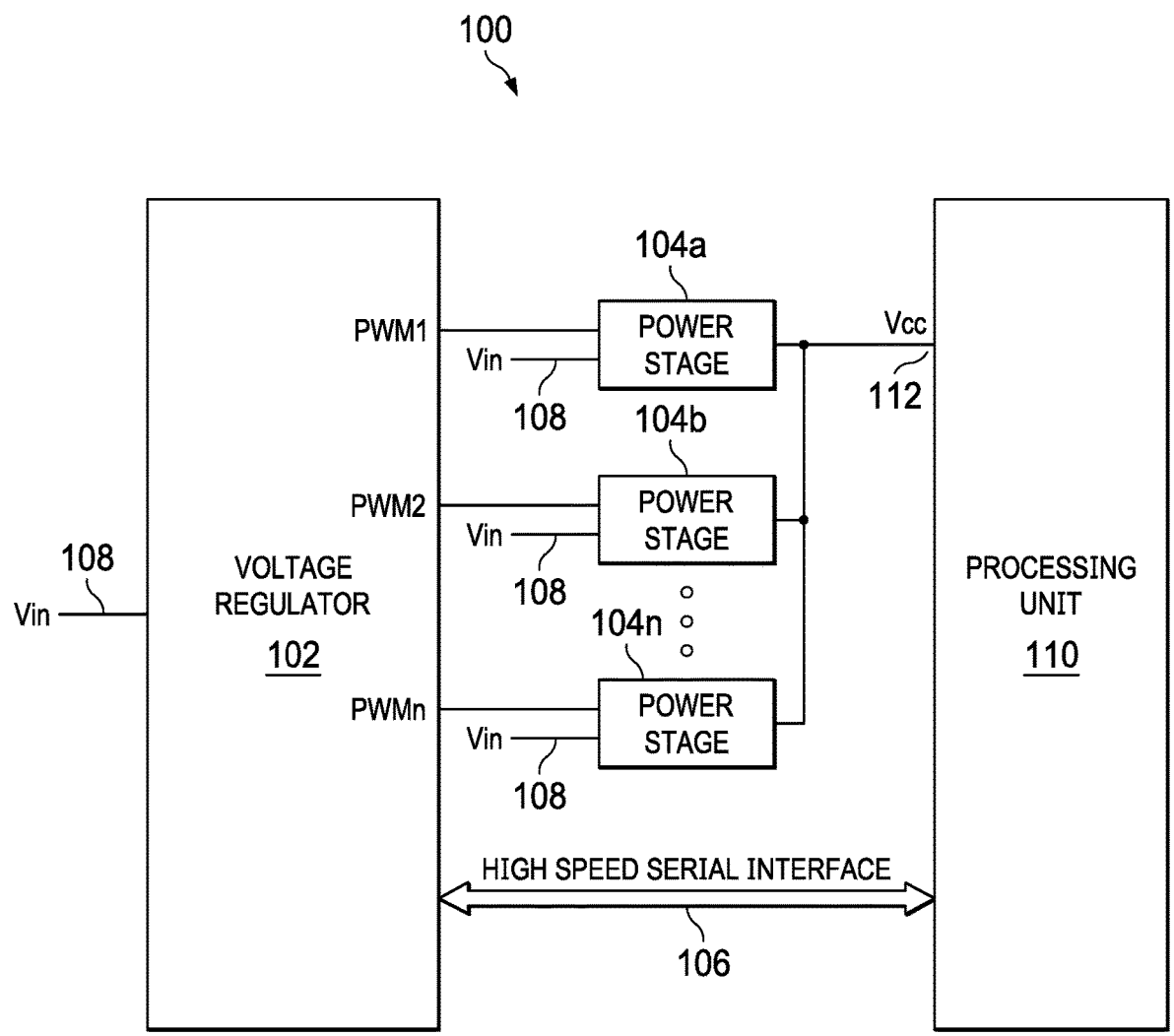
FIG. 1 is a block diagram of an example system in which several aspects of example embodiments can be implemented.

FIG. 1 is a block diagram of an example system 100 in which several aspects of example embodiments can be implemented. The system 100 includes a multiphase voltage regulator 102, a processing unit 110, a high speed serial interface (HSSI) 106 and multiple power stages illustrated as 104a, 104b to 104n. In one example, the power stages 104a to 104n are inside the multiphase voltage regulator 102. The multiphase voltage regulator 102 receives an input voltage Vin 108 and generates multiple PWM (pulsed width modulated) signals represented as PWM1, PWM2 and $PWM_n$, where n is a positive integer greater than 2. Each power stage receives a PWM signal from the multiphase voltage regulator 102 and the input voltage Vin 108. The outputs of the power stages are combined to provide a regulated output voltage Vcc 112 to the processing unit 110.

The processing unit 110 communicates with the multiphase voltage regulator 102 through a high speed serial interface (HSSI) 106. The HSSI 106 is also referred as power bus interface or power bus architecture. The specifications for the HSSI are defined by respective manufacturers of processing unit 110. Examples of the industry standard protocols for HSSI include SVID (Serial Voltage Identification), SVI (Serial Voltage Identification Interface) and AVS (Adaptive Voltage Scaling). Those protocols are useful in various systems similar to system 100 based on the compatibility of the processing unit 110.

The processing unit 110 through the HSSI 106 controls the regulated output voltage Vcc 112. Based on an input from the processing unit 110, the voltage regulator 102 modulates the multiple PWM signals (PWM1, PWM2 and PWMn) to generate the desired regulated output voltage Vcc 112. The multiple PWM signals can be activated based on the requirements of the processing unit 110. In one example, the processing unit 110 compares the regulated output voltage Vcc 112 to a required voltage and accordingly adds or removes one or more PWM signals for achieving a low power mode or a steady state mode.

The system 100 is applicable to multiple fields, such as server, storage, communication, automotive, personal computer and gaming. Based on an application, the processing unit 110 and the corresponding HSSI 106 used in the system 100 vary. However, the multiphase voltage regulator 102 used in existing systems can only support a single type of processing unit 110 and a single protocol for HSSI 106. The existing multiphase voltage regulator 102 does not support custom commands from the processing unit 110. Also, the existing multiphase voltage regulator 102 does not support customizations made to industry standard protocols for HSSI. One approach includes voltage regulators, which implement respective industry standard protocols, but that approach greatly increases the system 100 area (which is undesirable).

The industry standard protocols for HSSI are updated from time to time. The updates include change in command response, addition of new commands, and addition of new registers. However, the multiphase voltage regulator 102 in existing systems is not adaptable to such updates. The multiphase voltage regulator 102 in existing systems does not support a newly developed processing unit which includes new optimized protocol or new commands. An independent IP (intellectual property) that defines a new multiphase voltage regulator needs to be developed to interact with such a newly developed processing unit. The development of this independent IP is time consuming and intensive process. Also the development may come at the cost of increased area, complexity and power.

Figure 2:
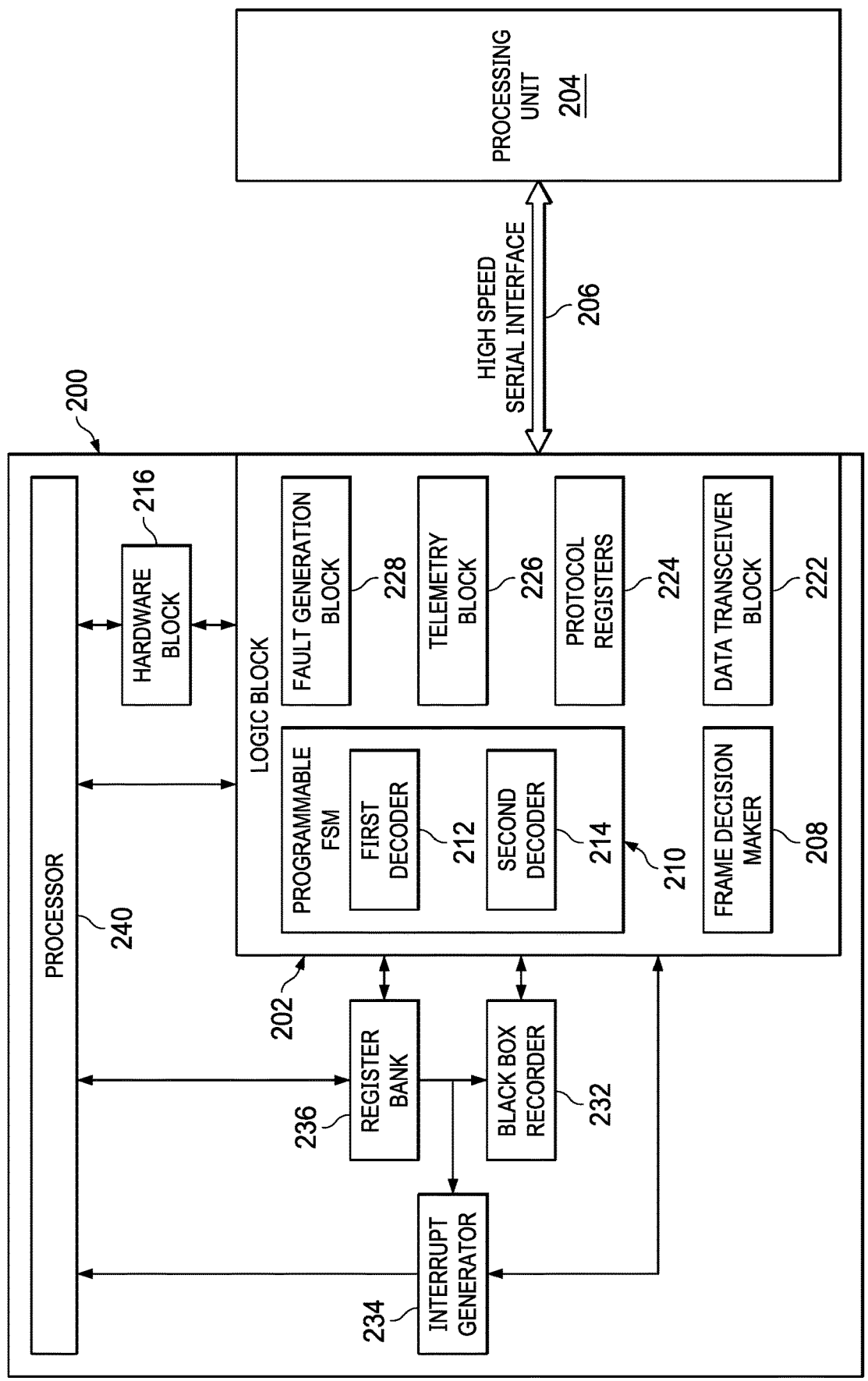
FIG. 2 is a block diagram of a voltage regulator, according to an embodiment.

FIG. 2 is a block diagram of a voltage regulator 200, according to an embodiment. The voltage regulator 200 includes the components of the multiphase voltage regulator 102 (FIG. 1), but these components are not shown in FIG. 2 for simplicity. The voltage regulator 200 may include one or more conventional components that are not described herein for simplicity of the description. The voltage regulator 200, similar to multiphase voltage regulator 102, communicates with a processing unit 204, which is external to the voltage regulator 200. In one example, the processing unit 204 may be placed on the same PCB (printed circuit board) or board as the voltage regulator 200. The voltage regulator 200 can be a single phase or multiphase voltage regulator. The voltage regulator 200 can also function as a multiphase power controller.

The voltage regulator 200 includes a logic block 202 which communicates with the processing unit 204 through a high speed serial interface (HSSI) 206. The logic block 202 includes a frame decision maker 208, a programmable FSM (finite state machine) 210, a data transceiver block 222 protocol registers 224, a telemetry block 226 and a fault generation block 228. All components of the logic block 202 communicate with each other and with other components outside of the logic block 202. However, all such connections are not shown in FIG. 2 for simplicity.

The voltage regulator 200 also includes a black box recorder 232, an interrupt generator 234, a register bank 236 and a processor 240. The voltage regulator 200 also includes a hardware block 216. The voltage regulator may include one or more hardware blocks. Example hardware blocks include one or more power stages, phase management circuitry, power sources, control circuitry, drivers, internal loads, switches and comparators.

The logic block 202 is coupled to the HSSI 206. The programmable FSM 210 is coupled to the HSSI 206 and the frame decision maker 208. The data transceiver block 222 is coupled to the programmable FSM 210 and the frame decision maker 208. The protocol registers 224 are coupled to the programmable FSM 210 and to the data transceiver block 222. The telemetry block 226 is coupled to the programmable FSM 210 and the data transceiver block 222. The fault generation block 228 is coupled to the telemetry block, the data transceiver block and the programmable FSM 210. The processor 240 is coupled to the logic block 202 and is capable of communicating with all the blocks inside the logic block 202.

The register bank 236 is coupled to the processor 240 and to the logic block 202. The interrupt generator 234 is coupled to the register bank 236 and to the logic block 202. The black box recorder 232 is coupled to the register bank 236 and to the interrupt generator 234. The hardware block 216 is coupled to the processor 240 and to the logic block 202. Each block or component of the voltage regulator 200 may also be coupled to other blocks in FIG. 2, but those connections are not described herein for brevity. Also, each block or component of FIG. 2 may be coupled to conventional components of a voltage regulator, which are not shown in FIG. 2 for simplicity.

In operation of the voltage regulator 200, the logic block 202 receives multiple frames on the high speed serial interface (HSSI) 206. In one example, the frames are received from the processing unit 204. In another example, the voltage regulator 200 receives multiple frames over HSSI from devices, such as CPLD (complex programmable logic device) and FPGA (field programmable gate array). In yet another example, the voltage regulator 200 communicates over HSSI with any device capable of generating frames. Each frame includes multiple data bits. In one example, the logic block 202 receives a stream of data bits. In another example, each frame includes multiple packets, and each packet is received serially at an edge of a clock. Each frame may include one or more commands to be executed by the voltage regulator 200.

The programmable FSM 210 includes a first decoder 212 and a second decoder 214. The first decoder 212 decodes a frame compliant with a first protocol for high speed serial interface (HSSI) and the second decoder 214 decodes a frame compliant with a second protocol for HSSI. Examples of the industry standard protocols for HSSI include SVID (Serial Voltage Identification), SVI (Serial Voltage Identification Interface) and AVS (Adaptive Voltage Scaling). In one example, the first decoder 212 is compliant with the SVID protocol and the second decoder 214 is compliant with the SVI protocol.

The protocol registers 224 store protocol information corresponding to the first protocol and the second protocol. The telemetry block 226 generates telemetry information responsive to a set of intrinsic parameters and the protocol information stored in the protocol registers. Examples of the telemetry information include current, voltage, temperature and power state of the voltage regulator 200. The intrinsic parameters are determined by measuring current and voltage parameters across different blocks in the voltage regulator 200. The telemetry information is provided to the processing unit 204 over HSSI 206. The telemetry information is used by the processing unit 204 to decide various factors, such as adding or removing phases, changing input of power stages and optimal fault protection mechanism.

The fault generation block 228 generates a fault signal responsive to the protocol information stored in the protocol registers. The fault signal is provide to the processing unit 204 through HSSI 206. The cause and logic of generating the fault signal are based on the settings stored in the register bank 236. The register bank 236 stores configuration settings corresponding to each of the first and second protocols. Example configuration settings include general configuration setting(s), frame configuration setting(s), command configuration setting(s) and data configuration settings).

The interrupt generator 234 provides an interrupt to the processor 240. The black box recorder 232 maintains a record of each executed command or instruction. The black box recorder 232 records events, such as executed commands, data processed and fault signals generated. In one example, the black box recorder 232 stores a sequence of events, such as external commands, IO based internal signal latching, and timer activation. The black box recorder 232 is dynamically configurable to record new commands or to avoid recording frequently performed operations in the voltage regulator 200.

Generally, the voltage regulator 200 receives a frame that includes one or more commands to be executed by the voltage regulator 200. Based on the incoming frame, the processor 240 configures the logic block 202 and the register bank 236 to one of the industry standard protocols for HSSI. The programmable FSM 210, the data transceiver block 222, the protocol registers 224, the telemetry block 226, the fault generation block 228, the black box recorder 232 and the register bank 236 are all configured by the processor 240 to one of the protocols.

The frame includes one or more commands. One of the first decoder 212 or the second decoder 214 in the programmable FSM 210 decodes the command in the frame. The data transceiver block 222 receives the configuration settings from the register bank 236. The configuration settings include frame configuration setting(s), command configuration setting(s) and data configuration setting's). The data transceiver block 222 uses these configuration settings to process the command in the frame and accordingly estimate a response type. The data transceiver block 222 is highly configurable and is responsible for processing of the command received in the frame and sending the response type to the processing unit 204. Thus, a closed loop communication exists between the voltage regulator 200 and the processing unit 204.

The response type is one of an acknowledgement response, a non-acknowledgement response or a reject response. The response generated is based on multiple parameters, such as type of command, power state, slew rate of an output voltage, payload data validity, parity error, and frame error. This response type is sent back to the processing unit 204 over HSSI 206. When the voltage regulator 200 is unable to process a command in the frame, the programmable FSM 210 generates a reject response. When the frame decision maker 208 is unable to process the frame, the programmable FSM 210 generates a non-acknowledgement response. Based on the processing of the frame in the data transceiver block 222 using the configuration settings, if the command can be executed by the voltage regulator 200, the data transceiver block 222 configures the programmable FSM 210 to generate an acknowledgement response. Thus, the voltage regulator 200 is capable of responding to the processing unit 204 by generating one of the acknowledgement response, the non-acknowledgement response or the reject response. In this manner, the processing unit 204 is not required to enter a freeze or nonresponsive state, which happens in conventional systems where the processing unit 204 keeps waiting to receive a response from a voltage regulator.

After sending the acknowledgement response, the data transceiver block 222 configures the hardware block 216 to process the command when the frame includes a command for the hardware block. In another case, the data transceiver block 222 configures the interrupt generator 234 to generate an interrupt to the processor 240 when the frame includes a firmware based command. The processor 240 processes the firmware based command. In executing the command, the data generated by the hardware block 216 and the processor 240 are provided to the processing unit 204 through the HSSI 206.

The capability of the voltage regulator 200 to execute the firmware based command through the processor 240 adds more flexibility to its operation. Multiple configurations are possible in the voltage regulator 200 because of the firmware configurability, such as state transitions in the programmable FSM 210, look-up table based response generation for each command, validity check for command payload, validity check for register write data, configuring commands as supported or unsupported, configuring registers as not-supported/read only/write only, duration of clock and execution of each command.

The frame decision maker 208 receives multiple frames. The frame decision maker 208 generates an interpret frame from a first frame of the multiple frames. The frame decision maker 208 provides the interpret frame to the processor 240. Based on the interpret frame, the processor 240 programs the logic block 202 and the register bank 236. In the logic block 202, the processor 240 enables one of the first decoder 212 or the second decoder 214 in the programmable FSM 210. Also, the processor 240 activates a set of protocol registers in the logic block 202 corresponding to one of the first protocol or the second protocol. Based on the interpret frame, the processor 240 enables configuration settings in the register bank 236 corresponding to one of the first protocol or the second protocol.

The data transceiver block 222 receives a first frame of the multiple frames. In one example, the first frame includes a command known to the voltage regulator 200. In another example, the first frame includes a command already defined in the voltage regulator 200. The data transceiver block 222 receives configuration settings from the register bank 236 and process the first frame based on the configuration settings. The data transceiver block 222 estimates a response type and configures the programmable FSM 210 to generate at least one of the acknowledgement response, the non-acknowledgement response or the reject response.

When the voltage regulator 200 is unable to process a command in the first frame, the programmable FSM 210 generates the reject response. When the frame decision maker 208 is unable to process the first frame and is not able to generate the interpret frame, the programmable FSM 210 generates the non-acknowledgement response. Each of the acknowledgement response, the non-acknowledgement response and the reject response are sent to the processing unit 204 over HSSI 206.

When the data transceiver block 222 configures the programmable FSM 210 to generate the acknowledgement response, the data transceiver block 222, in one case, configures the hardware block 216 to process the first frame when the first frame includes a command for the hardware block. The hardware block 216 generates a first data set responsive to the command. In another case, the data transceiver block 222 configures the interrupt generator 234 to generate an interrupt to the processor 240 when the first frame includes a firmware based command. The processor 240 generates a second data set responsive to the firmware based command.

The data transceiver block 222 receives the first and the second data set from the hardware block 216 and the processor 240 respectively. The data transceiver block 222 provides these data sets to the programmable FSM 210, which sends it to the processing unit 204 over HSSI 206.

The data transceiver block 222 receives a second frame of the multiple frames, in one example, the second frame includes a command unknown to the voltage regulator 200 or a new command for the voltage regulator 200. In another example, the second frame includes a command undefined in the voltage regulator 200. The data transceiver block 222 receives configuration settings from the register bank 236 and processes the second frame based on the configuration settings. The data transceiver block 222 estimates a response type and configures the programmable FSM 210 to generate at least one of the acknowledgement response, the non-acknowledgement response or the reject response.

When the data transceiver block 222 configures the programmable FSM 210 to generate the acknowledgement response, the data transceiver block 222, configures the interrupt generator 234 to generate an interrupt to the processor 240. The processor 240 generates a third data set on processing the command in the second frame. The data transceiver block 222 receives the third data set from the processor 240. The data transceiver block 222 provides the third data set to the programmable FSM 210, which sends it to the processing unit 204 over HSSI 206. In one example, to process the new or unknown command in the second frame, the processor 240 accesses reserved memory locations in the register bank 236 for obtaining multiple parameters, such as payload value, instruction set, payload operands and new signals definition.

Thus, the voltage regulator 200 also supports any customization made to industry, standard protocols for HSSI. For example, when a manufacturer of the processing unit 204 updates the protocol for HSSI by adding new commands or by adding new registers or by changing commands, the voltage regulator 200 is able to support such customization.

The voltage regulator 200 overcomes multiple limitations in existing voltage regulators. The voltage regulator 200 supports one or more industry standard protocols for HSSI. The voltage regulator 200 is capable of responding to multiple industry standard protocols for such as SVID (Serial Voltage Identification), SVI (Serial Voltage Identification Interface) and AVS (Adaptive Voltage Scaling). Also, the voltage regulator 200 is capable of responding to any version of these standard protocols, such as SVI2 and SVI3. Thus, when the processing unit 204 communicates with the voltage regulator 200 using the SVID protocol, the voltage regulator 200 is capable of responding to such communication. Also, when the processing unit 204 communicates with the voltage regulator 200 using the SVI protocol, the voltage regulator 200 is capable of responding to such communication. Since the voltage regulator 200 is capable of supporting one or more industry standard protocols for HSSI, it offers a unified bus architecture for communication with the processing unit 204.

The voltage regulator 200 is useful in power management systems for various applications, such as server, storage, communication, automotive, personal computer, gaming server, storage, communication, automotive, personal computer and gaming. The voltage regulator 200 is capable of supporting processors from different manufacturers. Thus, the voltage regulator 200 does not require development of additional hardware to address changes in the protocol or commands of the processing unit 204. Such development of additional hardware would otherwise consume time and manpower, which are avoided by the flexible configuration of the voltage regulator 200.

Figure 3:
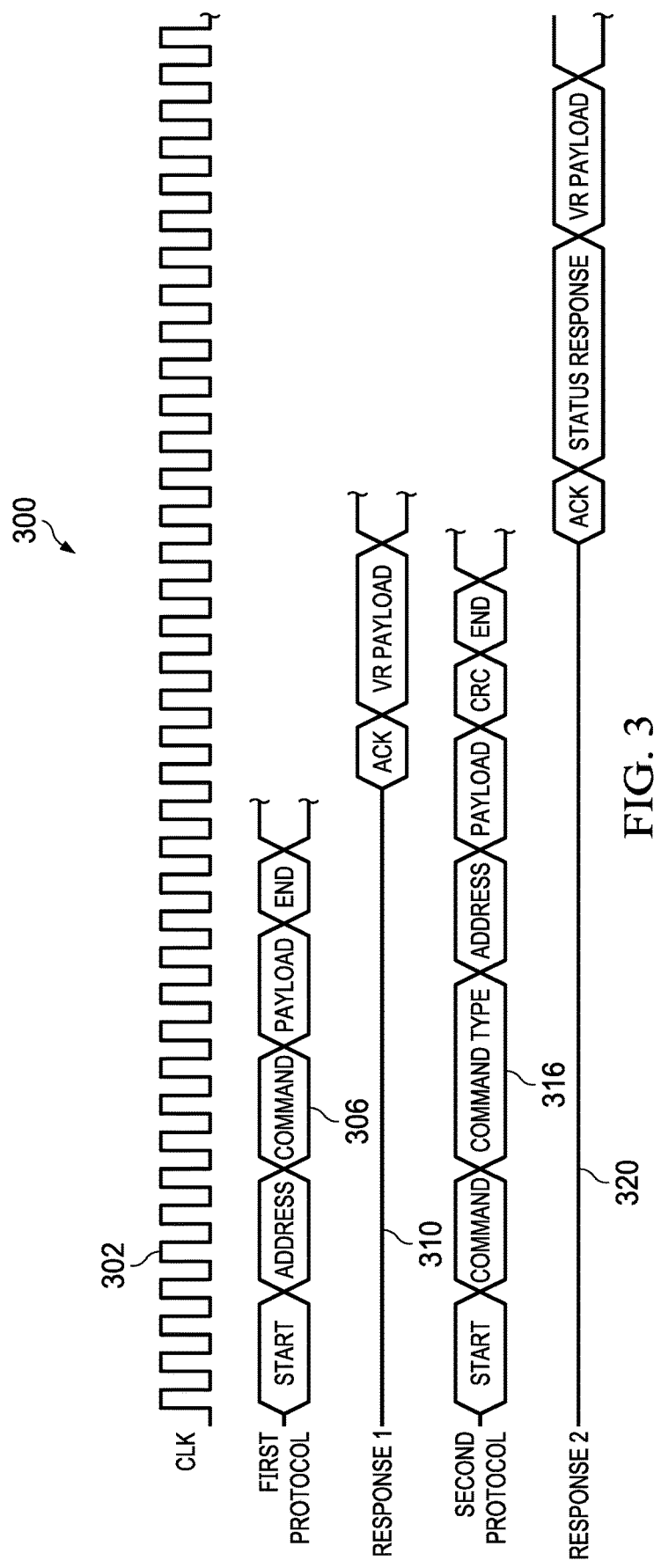
FIG. 3 is a timing diagram of operation of the voltage regulator 200 in FIG. 2, according to an embodiment.

FIG. 3 is a timing diagram 300 of operation of the voltage regulator 200 (FIG. 2), according to an embodiment. The timing diagram 300 is described in connection with the operation of the voltage regulator 200 of FIG. 2. The voltage regulator 200 and the processing unit 204 receive a clock signal CLK 302 of the timing diagram 300. The clock signal CLK 302 is used to synchronize the voltage regulator 200 and the processing unit 204.

The voltage regulator 200 receives a frame corresponding to a first protocol 306 and generates a first response RESPONSE1 310. In one example, the first protocol 306 is an SVID protocol. The timing diagram 300 illustrates a first frame of the first protocol 306 received from the processing unit 204. The first frame of the first protocol 306 includes multiple bits designated as start, address, command, payload and end. The start and end provide starting and ending bits of the frame. The address and command denote the address of a register in the voltage regulator 200 and the command to be executed by the voltage regulator 200 respectively. The payload represents the data bits, which are to be processed by the voltage regulator 200 using the command.

Responsive to the first frame of the first protocol 306, the processor 240 configures the logic block 202 and the register bank 236 to comply with the first protocol 306. In the logic block 202, the processor 240 enables one of the first decoder 212 or the second decoder 214 in the programmable FSM 210. Also, the processor 240 activates a set of protocol registers in the logic block 202 corresponding to the first protocol 306. The processor 240 enables configuration settings in the register bank 236 corresponding to the first protocol 306.

One of the first decoder 212 or the second decoder 214 in the programmable FSM 210 decodes the command in the first frame. The data transceiver block 222 receives the configuration settings from the register bank 236. The data transceiver block 222 uses these configuration settings to process the command in the first frame and accordingly estimate a response type. The response type is one of an acknowledgement response, a non-acknowledgement response or a reject response. The first response RESPONSE1 310 is shown in the timing diagram 300. The first response RESPONSE1 310 is sent back to the processing unit 204 over HSSI 206. The first response RESPONSE1 310 includes an acknowledgement response and a VR payload, which represent the data generated by the voltage regulator 200 on execution of the command received in the first frame.

The timing diagram 300 also illustrate a frame corresponding to a second protocol 316 received by the voltage regulator 200 and accordingly a second response RESPONSE2 320 generated by the voltage regulator 200. In one example, the second protocol 316 is an SVI protocol. The timing diagram 300 illustrates a first frame of the second protocol 316 received from the processing unit 204. The first frame of the second protocol 316 includes multiple bits designated as start, command, command type, address, payload, CRC and end. The start and end provide starting and ending bits of the frame. The address and command denote the address of a register in the voltage regulator 200 and the command to be executed by the voltage regulator 200 respectively. The payload represents the data bits, which are to be processed by the voltage regulator 200 using the command.

Responsive to the first frame of the second protocol 316, the processor 240 configures the logic block 202 and the register bank 236 to comply with the second protocol 316. In the logic block 202, the processor 240 enables one of the first decoder 212 or the second decoder 214 in the programmable FSM 210. Also, the processor 240 activates a set of protocol registers in the logic block 202 corresponding to the second protocol 316. The processor 240 enables configuration settings in the register bank 236 corresponding to the second protocol 316.

One of the first decoder 212 or the second decoder 214 in the programmable FSM 210 decodes the command in the first frame. The data transceiver block 222 receives the configuration settings from the register bank 236. The data transceiver block 222 uses these configuration settings to process the command in the first frame and accordingly estimate a response type. The response type is one of an acknowledgement response, a non-acknowledgement response or a reject response. The second response RESPONSE2 320 is shown in the timing diagram 300. The second response RESPONSE2 320 is sent back to the processing unit 204 over HSSI 206. The second response RESPONSE2 320 includes an acknowledgement response, a status response and a VR payload, which represent the data generated by the voltage regulator 200 on execution of the command received in the first frame.

Thus, the voltage regulator 200 is capable of responding to multiple industry standard protocols for HSSI, such as SVID (Serial Voltage Identification), SVI (Serial Voltage Identification Interface) and AVS (Adaptive Voltage Scaling). Thus, when the processing unit 204 communicates with the voltage regulator 200 using the SVID protocol, the voltage regulator 200 is capable of responding to such communication. Also, when the processing unit 204 communicates with the voltage regulator 200 using the SVI protocol, the voltage regulator 200 is capable of responding to such communication. Since the voltage regulator 200 is capable of supporting one or more industry standard protocols for HSSI, it offers a unified bus architecture for communication with the processing unit 204.

Figure 4:
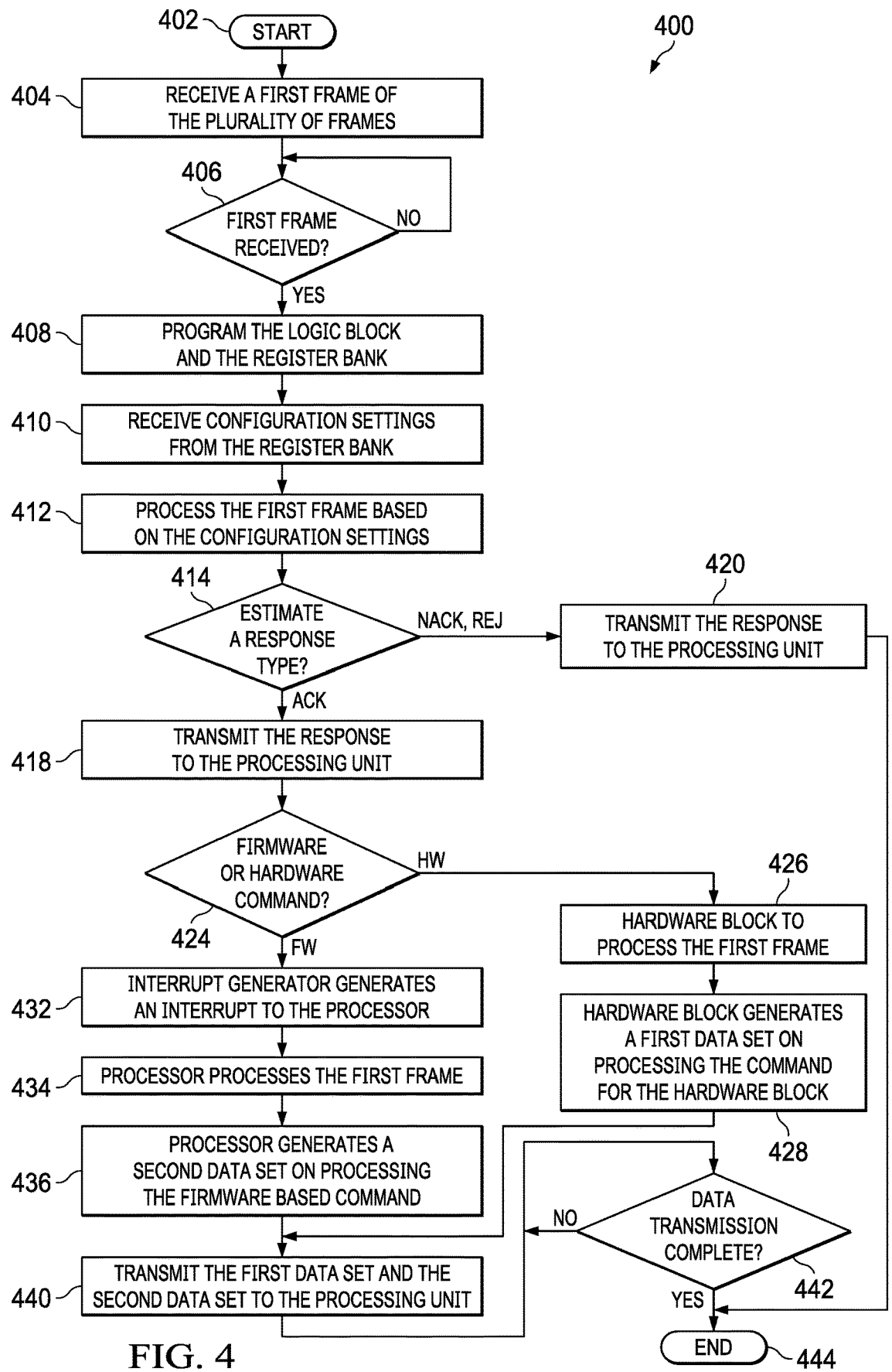
FIG. 4 is a flowchart of a method of operation of a voltage regulator, according to an embodiment.

FIG. 4 is a flowchart 400 of a method of operation of a voltage regulator, according to an embodiment. The flowchart 400 is described in connection with the voltage regulator 200 of FIG. 2. The flowchart starts at step 402 and ends at step 444. At step 404, a first frame of the multiple frames is received. At step 406, a check is performed if the first frame is received. Responsive to the first frame, the logic block and the register bank are programmed at step 408. In one example, the first frame includes a command which is known to the voltage regulator. In another example, the first frame includes a command already defined in the voltage regulator.

The voltage regulator 200 in FIG. 2 receives multiple frames. A first frame of the multiple frames is received by the voltage regulator 200. Based on the first frame, the processor 240 configures the logic block 202 and the register bank 236 to one of the industry standard protocols for HSSI. The programmable FSM 210, the data transceiver block 222, the protocol registers 224, the telemetry block 226, the fault generation block 228, the black box recorder 232 and the register bank 236 are all configured by the processor 240 to one of the protocols.

In one example, the frame decision maker 208 generates an interpret frame from a first frame of the multiple frames. The frame decision maker 208 provides the interpret frame to the processor 240. Based on the interpret frame, the processor 240 programs the logic block 202 and the register bank 236. In the logic block 202, the processor 240 enables one of the first decoder 212 or the second decoder 214 in the programmable FSM 210. Also, the processor 240 activates a set of protocol registers in the logic block 202 corresponding to one of the first protocol or the second protocol. Based on the interpret frame, the processor 240 enables configuration settings in the register bank 236 corresponding to one of the first protocol or the second protocol.

At step 410, configuration settings are received from the register bank, and the first frame is processed based on the configuration settings at step 412. In the voltage regulator 200, the data transceiver block 222 receives the first frame of the multiple frames. One of the first decoder 212 or the second decoder 214 in the programmable FSM 210 decodes the command in the first frame. The data transceiver block 222 receives configuration settings from the register bank 236 and process the first frame based on the configuration settings.

At step 414, a response type is estimated after processing of the first frame. The response type is at least one of an acknowledgement response ACK, a non-acknowledgement response NACK or a reject response REJ. The acknowledgement response ACK is sent to the processing unit at step 418, and the non-acknowledgement response NACK and the reject response REJ are sent to the processing unit at step 420. The data transceiver block 222, in the voltage regulator 200, estimates the response type and configures the programmable FSM 210 to generate at least one of the acknowledgement response ACK, the non-acknowledgement response NACK or the reject response REJ.

When the voltage regulator 200 is unable to process a command in the first frame, the programmable FSM 210 generates the reject response REJ. When the frame decision maker 208 is unable to process the first frame and is not able to generate the interpret frame, the programmable FSM 210 generates the non-acknowledgement response NACK. Each of the acknowledgement response ACK, the non-acknowledgement response NACK and the reject response REJ are sent to the processing unit 204 over HSSI 206.

When the acknowledgement response ACK is generated, the voltage regulator, at step 424, determines if the command in the first frame is a hardware command or a firmware command. When the command is for a hardware block, the hardware block processes the first frame at step 426 and generates a first data set on processing the command at step 428. When the command is a firmware command, an interrupt generator generates an interrupt to the processor at step 432. The processor processes the first frame at step 434 and generates a second data set on processing the firmware based command at step 436. The first data set and the second data set are provided to the processing unit at step 440. The voltage regulator checks if the transmission of the first data set or the second data set is complete at step 442.

In the voltage regulator 200, when the data transceiver block 222 configures the programmable FSM 210 to generate the acknowledgement response, the data transceiver block 222, in one case, configures the hardware block 216 to process the first frame when the first frame includes a command for the hardware block. The hardware block 216 generates a first data set responsive to the command. In another case, the data transceiver block 222 configures the interrupt generator 234 to generate an interrupt to the processor 240 when the first frame includes a firmware based command. The processor 240 generates a second data set responsive to the firmware based command.

The data transceiver block 222 receives the first and the second data set from the hardware block 216 and the processor 240 respectively. The data transceiver block 222 provides these data sets to the programmable FSM 210, which sends it to the processing unit 204 over HSSI 206.

The method illustrated by flowchart 400 enables a voltage regulator to overcome multiple limitations in existing voltage regulators. The voltage regulator using this method can support one or more industry standard protocols for HSSI, such as SVID (Serial Voltage Identification), SVI (Serial Voltage Identification Interface) and AVS (Adaptive Voltage Scaling).

Figure 5:
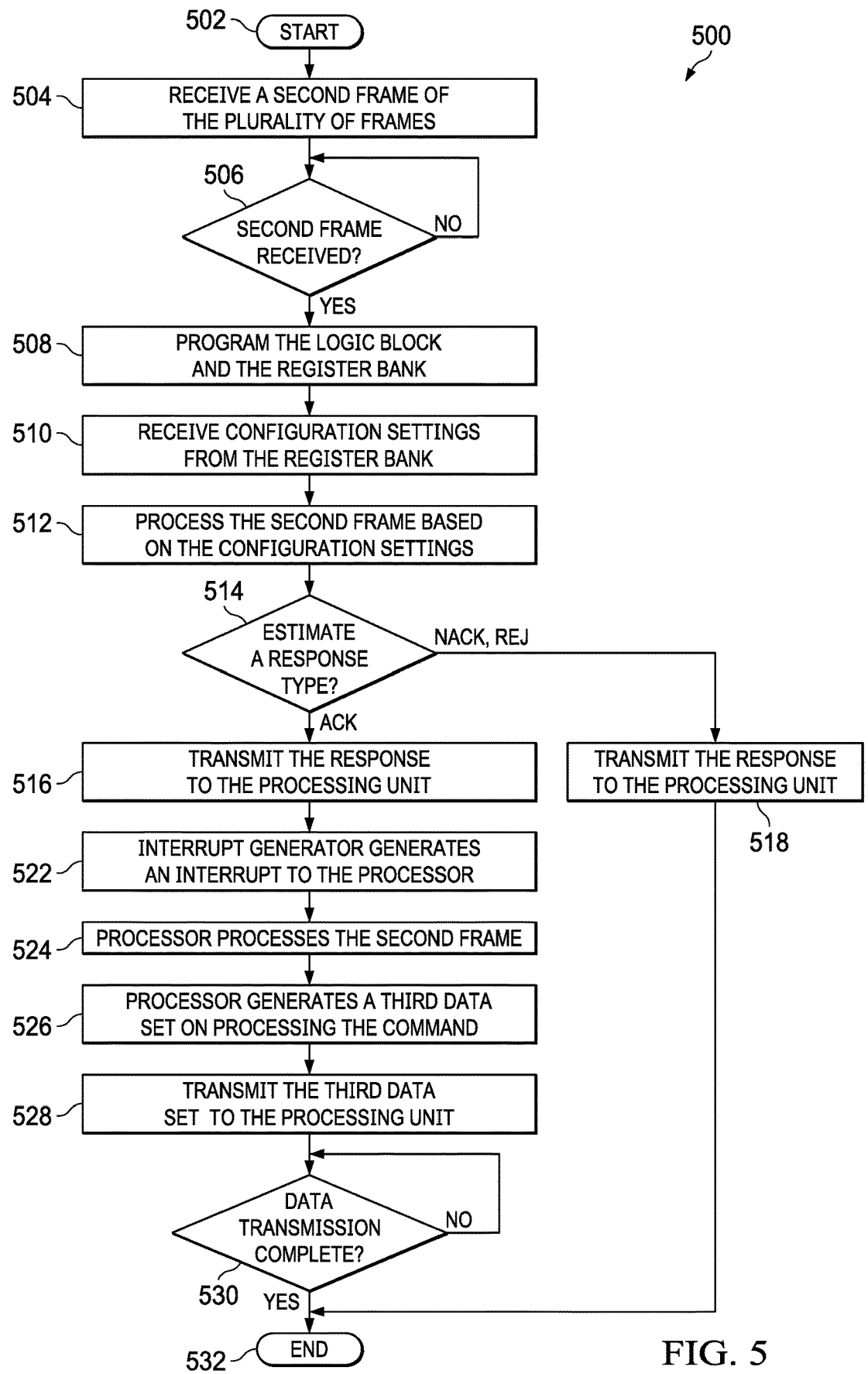
FIG. 5 is a flowchart of a method of operation of a voltage regulator, according to an embodiment.

FIG. 5 is a flowchart 500 of a method of operation of a voltage regulator, according to an embodiment. The flowchart 500 is described in connection with the voltage regulator 200 of FIG. 2. The flowchart starts at step 502 and ends at step 532. At step 504, a second frame of the multiple frames is received. At step 506, a check is performed if the second frame is received. Responsive to the second frame, the logic block and the register bank are programmed at step 508. In one example, the second frame includes a command which is unknown or new to the voltage regulator. In another example, the second frame includes a command undefined in the voltage regulator.

The voltage regulator 200 in FIG. 2 receives multiple frames. A second frame of the multiple frames is received by the voltage regulator 200. Based on the second frame, the processor 240 configures the logic block 202 and the register bank 236 to one of the industry standard protocols for HSSI. The programmable FSM 210, the data transceiver block 222, the protocol registers 224, the telemetry block 226, the fault generation block 228, the black box recorder 232 and the register bank 236 are all configured by the processor 240 to one of the protocols.

In one example, the frame decision maker 208 generates an interpret frame from a second frame of the multiple frames. The frame decision maker 208 provides the interpret frame to the processor 240. Based on the interpret frame, the processor 240 programs the logic block 202 and the register bank 236. In the logic block 202 the processor 240 enables one of the first decoder 212 or the second decoder 214 in the programmable FSM 210. Also, the processor 240 activates a set of protocol registers in the logic block 202 corresponding to one of the first protocol or the second protocol. Based on the interpret frame, the processor 240 enables configuration settings in the register bank 236 corresponding to one of the first protocol or the second protocol.

At step 510, configuration settings are received from the register bank, and the second frame is processed based on the configuration settings at step 512. In the voltage regulator 200, the data transceiver block 222 receives the second frame of the multiple frames. One of the first decoder 212 or the second decoder 214 in the programmable FSM 210 decodes the command in the second frame. The data transceiver block 222 receives configuration settings from the register bank 236 and processes the second frame based on the configuration settings.

At step 514, a response type is estimated after processing of the second frame. The response type is at least one of an acknowledgement response ACK, a non-acknowledgement response NACK or a reject response REJ. The acknowledgement response ACK is sent to the processing unit at step 516, and the non-acknowledgement response NACK and the reject response REJ are sent to the processing unit at step 518. The data transceiver block 222, in the voltage regulator 200, estimates the response type and configures the programmable FSM 210 to generate at least one of the acknowledgement response ACK, the non-acknowledgement response NACK or the reject response REJ.

When the voltage regulator 200 is unable to process a command in the second frame, the programmable FSM 210 generates the reject response REJ. When the frame decision maker 208 is unable to process the second frame and is not able to generate the interpret frame, the programmable FSM 210 generates the non-acknowledgement response NACK. Each of the acknowledgement response ACK, the non-acknowledgement response NACK and the reject response REJ are sent to the processing unit 204 over HSSI 206.

When the acknowledgement response ACK is generated by the voltage regulator, an interrupt generator generates an interrupt to the processor, at step 522. The processor processes the second frame at step 524 and generates a third data set on processing the command at step 526. The third data set is provided to the processing unit, at step 528. The voltage regulator checks if the transmission of the third data set is complete at step 530.

In the voltage regulator 200, when the data transceiver block 222 configures the programmable FSM 210 to generate the acknowledgement response, the data transceiver block 222 configures the interrupt generator 234 to generate an interrupt to the processor 240. The processor 240 generates a third data set on processing the command in the second frame. The data transceiver block 222 receives the third data set from the processor 240. The data transceiver block 222 provides the third data set to the programmable FSM 210, which sends it to the processing unit 204 over HSSI 206. In one example, to process the new or unknown command, the processor 240 accesses reserved memory locations in the register bank 236 for obtaining multiple parameters, such as payload value, instruction set, payload operands and new signals definition The method illustrated by flowchart 500 enables a voltage regulator to support any customization made to industry standard protocols for HSSI. For example, when a manufacturer of the processing unit 204 updates the protocol for HSSI by adding new commands or by adding new registers or by changing commands, the method illustrated by flowchart 500 enables the voltage regulator to support such customizations.

Figure 6:
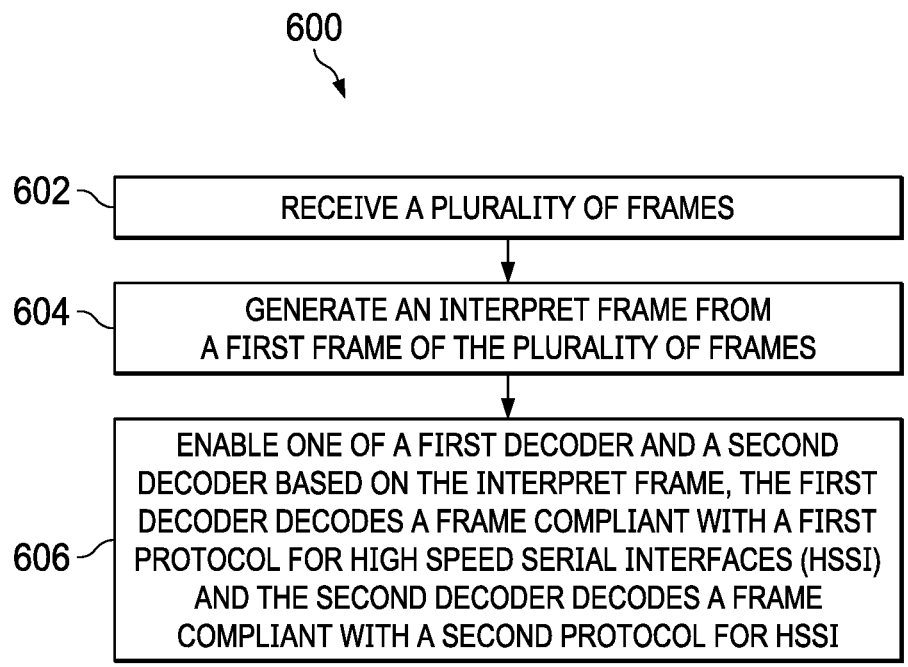
FIG. 6 is a flowchart of a method of operation of a voltage regulator, according to an embodiment.

FIG. 6 is a flowchart 600 of a method of operation of a voltage regulator, according to an embodiment. The flowchart 600 is described in connection with the voltage regulator 200 of FIG. 2. At step 602, multiple frames are received, and an interpret frame is generated from a first frame of the multiple frames at step 604. In the voltage regulator 200 in FIG. 2, the frame decision maker 208 receives multiple frames. The frame decision maker 208 generates an interpret frame from a first frame of the multiple frames. The frame decision maker 208 provides the interpret frame to the processor 240.

At step 606, one of a first decoder or a second decoder is enabled based on the interpret frame. The first decoder decodes a frame compliant with a first protocol for high speed serial interface (HSSI) and the second decoder decodes a frame compliant with a second protocol for HSSI. In voltage regulator 200, based on the interpret frame, the processor 240 programs the logic block 202 and the register bank 236. In the logic block 202, the processor 240 enables one of the first decoder 212 or the second decoder 214 in the programmable FSM 210.

The first decoder 212 decodes a frame compliant with a first protocol for high speed serial interface (HSSI) and the second decoder 214 decodes a frame compliant with a second protocol for HSSI. Examples of the industry standard protocols for HSSI include SVID (Serial Voltage Identification), SVI (Serial Voltage Identification Interface) and AVS (Adaptive Voltage Scaling). In one example, the first decoder 212 is compliant with the SVID protocol and the second decoder 214 is compliant with the SVI protocol.

The protocol information corresponding to the first protocol and the second protocol are stored in protocol registers. Also, configuration settings corresponding to each of the first and second protocols are stored in a register bank. Examples of the configuration settings include general configuration setting(s), frame configuration setting(s), command configuration setting(s) and data configuration setting(s). For example, in the voltage regulator 200, the protocol registers 224 store protocol information corresponding to one of the first protocol or the second protocol.

The register bank 236 stores configuration settings corresponding to each of the first and second protocols.

A set of protocol registers corresponding to one of the first protocol or the second protocol is activated, and configuration settings corresponding to one of the first protocol or the second protocol are enabled in the register bank. In voltage regulator 200, the processor 240 activates a set of protocol registers in the logic block 202 corresponding to one of the first protocol or the second protocol. Based on the interpret frame, the processor 240 enables configuration settings in the register bank 236 corresponding to one of the first protocol or the second protocol.

The configuration settings are received from the register bank and the first frame is processed based on the configuration settings. A response type is estimated after processing of the first frame. The response type is at least one of an acknowledgement response, a non-acknowledgement response or a reject response. In the voltage regulator 200, the data transceiver block 222 receives the first frame of the multiple frames. One of the first decoder 212 or the second decoder 214 in the programmable FSM 210 decodes the command in the first frame. The data transceiver block 222 receives configuration settings from the register bank 236 and process the first frame based on the configuration settings. The data transceiver block 222, in the voltage regulator 200, estimates the response type and configures the programmable FSM 210 to generate at least one of the acknowledgement response, the non-acknowledgement response or the reject response.

When the acknowledgement response is generated, a hardware block is configured to process the first frame and generates a first data set responsive to the command. When the command in the first frame is a firmware based command, an interrupt generator generates an interrupt to the processor. The processor processes the first frame and generates a second data set on processing the firmware based command. The first data set and the second data set are sent to the processing unit.

In the voltage regulator 200, when the data transceiver block 222 configures the programmable FSM 210 to generate the acknowledgement response, the data transceiver block 222, in one case, configures the hardware block 216 to process the first frame when the first frame includes a command for the hardware block. The hardware block 216 generates a first data set responsive to the command. In another case, the data transceiver block 222 configures the interrupt generator 234 to generate an interrupt to the processor 240 when the first frame includes a firmware based command. The processor 240 generates a second data set responsive to the firmware based command. The first data set and the second data set are provided to the processing unit 204 over HSSI 206.

The method illustrated by flowchart 600 enables a voltage regulator to overcome multiple limitations in existing voltage regulators. The voltage regulator using this method can support one or more industry standard protocols for HSSI, such as SVID (Serial Voltage Identification), SVI (Serial Voltage Identification Interface) and AVS (Adaptive Voltage Scaling).

Figure 7:
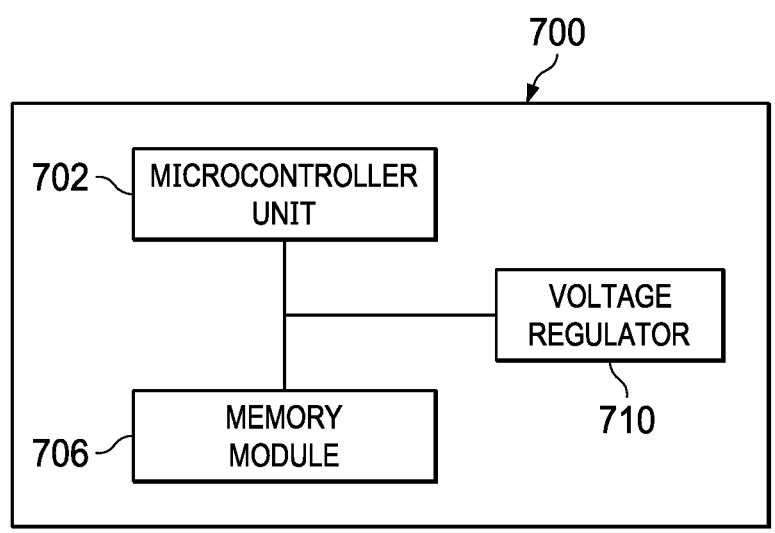
FIG. 7 is a block diagram of an example device in which several aspects of example embodiments can be implemented.

FIG. 7 is a block diagram of an example device 700 in which several aspects of example embodiments can be implemented. The device 700 is, or is incorporated into or is part of, a server farm, a vehicle, a communication device, a transceiver, a personal computer, a gaming platform, a computing device, or any other type of electronic system. The device 700 may include one or more conventional components that are not described herein for simplicity of the description.

In one example, the device 700 includes a microcontroller unit 702 and a memory module 706. The microcontroller unit 702 can be a CISC-type (complex instruction set computer) CPU, RISC-type CPU (reduced instruction set computer), a digital signal processor (DSP), a processor, a CPLD (complex programmable logic device) or an FPGA (field programmable gate array).

The memory module 706 (which can be memory such as RAM, flash memory, or disk storage) stores one or more software applications (e.g., embedded applications) that, when executed by the microcontroller unit 702, performs any suitable function associated with the device 700.

The microcontroller unit 702 usually comprises memory and logic, which store information frequently accessed from the memory module 706. The device 700 includes a voltage regulator 710. In one example, the microcontroller unit 702 may be placed on the same PCB or board as the voltage regulator 710. In another example, the microcontroller unit 702 is external to the device 700. The voltage regulator 710 can be a single phase or multiphase voltage regulator. The voltage regulator 710 can also function as a multiphase power controller.

The voltage regulator 710 is similar, in connection and operation, to the voltage regulator 200 of FIG. 2. The voltage regulator 710 includes a logic block which communicates with the processing unit through a high speed serial interface (HSSI). The logic block includes a frame decision maker, a programmable FSM (finite state machine), a data transceiver block, protocol registers, a telemetry block and a fault generation block. The voltage regulator 710 also includes an interrupt generator, a register bank and a processor.

The logic block, in the voltage regulator 710, receives multiple frames on the high speed serial interface (HSSI). The frames are received from the microcontroller unit 702. Each frame may include one or more commands to be executed by the voltage regulator 710. The programmable FSM includes a first decoder and a second decoder. The first decoder decodes a frame compliant with a first protocol for high speed serial interface (HSSI) and the second decoder decodes a frame compliant with a second protocol for HSSI. Examples of the industry standard protocols for HSSI include SVID (Serial Voltage Identification), SVI (Serial Voltage Identification Interface) and AVS (Adaptive Voltage Scaling).

Based on the incoming frame, the processor in the voltage regulator 710 configures the logic block and the register bank to one of the industry standard protocols for HSSI. The frame includes one or more commands. One of the first decoder or the second decoder in the programmable FSM decodes the command in the frame. The data transceiver block receives the configuration settings from the register bank. The data transceiver block uses these configuration settings to process the command in the frame and accordingly estimate a response type. The response type is one of an acknowledgement response, a non-acknowledgement response or a reject response.

The voltage regulator 710 supports any customization made to industry standard protocols for HSSI. For example, when a manufacturer of the microcontroller unit 702 updates the protocol for HSSI by adding new commands or by adding new registers or by changing commands, the voltage regulator 710 is able to support such customization.

The voltage regulator 710 overcomes multiple limitations in existing voltage regulators. The voltage regulator 710 supports one or more industry standard protocols for HSSI. The voltage regulator 710 is capable of responding to multiple industry standard protocols for HSSI, such as SVID (Serial Voltage Identification), SVI (Serial Voltage Identification Interface) and AVS (Adaptive Voltage Scaling).

Modifications are possible in the described embodiments, and other embodiments are possible, within the scope of the claims.

What is claimed is:

1. A voltage regulator comprising:
   a processor;
   a register bank coupled to the processor; and
   a logic block coupled to the processor and to the register bank, the logic block includes a frame decision maker, a first decoder and a second decoder, the frame decision maker configured to receive frames and configured to generate an interpret frame from a first one of the frames, and the processor, based on the interpret frame, configured to:
      activate a set of protocol registers storing protocol information corresponding to one of a first protocol or a second protocol;
      enable configuration settings in the register bank corresponding to one of the first protocol or the second protocol; and
      enable one of the first decoder and the second decoder to decode a command in the first frame, wherein each of the first decoder and the second decoder are configurable to decode a frame compliant with the first protocol and a frame compliant with the second protocol for high speed serial interface (HSSI).

2. The voltage regulator of claim 1, wherein the logic block further comprises:
   a programmable finite state machine (FSM) coupled to the frame decision maker, the programmable FSM includes the first decoder and the second decoder, and the programmable FSM configured to decode the frames; and
   a data transceiver block coupled to the programmable FSM, wherein the protocol registers are coupled to the data transceiver block.

3. The voltage regulator of claim 2, wherein the processor is configured to program the logic block and the register bank based on at least one of the frames.

4. The voltage regulator of claim 3, wherein the logic block further comprises:
   a telemetry block coupled to the programmable FSM and configured to generate telemetry information responsive to a set of intrinsic parameters and the protocol information stored in the protocol registers; and
   a fault generation block coupled to the telemetry block and configured to generate a fault signal responsive to the protocol information stored in the protocol registers.

5. The voltage regulator of claim 3, wherein:
   the register bank is configured to store configuration settings corresponding to each of the first and second protocols; and
   the configuration settings include a general configuration setting, a frame configuration setting, a command configuration setting and a data configuration setting.

6. The voltage regulator of claim 5, wherein the frame decision maker is configured to provide the interpret frame to the processor.

7. The voltage regulator of claim 1, further comprising:
   an interrupt generator coupled to the register bank and configured to provide an interrupt to the processor; and
   a black box recorder coupled to the register bank and the interrupt generator, the black box recorder configured to maintain a record of each executed command.

8. The voltage regulator of claim 7, wherein the data transceiver block is configured to:
   receive the first frame;
   receive the configuration settings from the register bank;
   process the first frame based on the configuration settings; and
   estimate a response type and configure the programmable FSM to generate at least one of an acknowledgement response, a non-acknowledgement response or a reject response.

9. The voltage regulator of claim 8, wherein when the data transceiver block configures the programmable FSM to generate the acknowledgement response, the data transceiver block:
   configures a hardware block to process the first frame when the first frame includes a command for the hardware block, and the hardware block generates a first data set responsive to the command; and
   configures the interrupt generator to generate an interrupt to the processor when the first frame includes a firmware based command, and the processor generates a second data set responsive to the firmware based command.

10. The voltage regulator of claim 9, wherein the data transceiver block is configured to: receive the first data set and the second data set from the hardware block and the processor respectively; and provide the first data set and the second data set to the programmable FSM.

11. The voltage regulator of claim 6, wherein the data transceiver block is configured to:
   receive a second one of the frames, the second frame including a new command;
   receive configuration settings from the register bank;
   process the second frame based on the configuration settings; and
   estimate the response type and configure the programmable FSM to generate at least one of an acknowledgement response, a non-acknowledgement response or a reject response;
   wherein when the acknowledgement response is generated, the data transceiver block configures the interrupt generator to generate an interrupt to the processor, and the processor generates a third data set responsive to the new command.

12. A method comprising:
   receiving frames;
   generating an interpret frame from a first one of the frames;
   programming a logic block based on the interpret frame, the logic block includes a first decoder and a second decoder;
   activating a set of protocol registers storing protocol information, based on the interpret frame, corresponding to one of a first protocol or a second protocol;
   enabling configuration settings in a register bank, based on the interpret frame, corresponding to one of the first protocol or the second protocol; and
   enabling one of the first decoder and the second decoder, based on the interpret frame, to decode a command in the first frame, wherein each of the first decoder and the second decoder are configurable to decode a frame compliant with the first protocol and a frame compliant with the second protocol for high speed serial interface (HSSI).

13. The method of claim 12, further comprising:
storing protocol information corresponding to the first protocol and the second protocol in protocol registers; and
storing configuration settings in the register bank corresponding to each of the first and second protocols, in which the configuration settings include a general configuration setting, a frame configuration setting, a command configuration setting and a data configuration setting.

14. The method of claim 13, further comprising:
receiving the first frame;
receiving configuration settings from the register bank;
processing the first frame based on the configuration settings;
estimating a response type; and
generating at least one of an acknowledgement response, a non-acknowledgement response or a reject response.

15. The method of claim 14, wherein generating the acknowledgement response further comprises:
configuring a hardware block to process the first frame when the first frame includes a command for the hardware block, the hardware block generates a first data set responsive to the command; and
configuring an interrupt generator to generate an interrupt to a processor when the first frame includes a firmware based command, the processor generates a second data set responsive to the firmware based command.

16. The method of claim 13, further comprising:
receiving a second one of the frames, the second frame including a new command;
receiving configuration settings from the register bank;
processing the second frame based on the configuration settings;
estimating a response type;
generating at least one of an acknowledgement response, a non-acknowledgement response or a reject response;
generating an interrupt to a processor when the acknowledgement response is generated; and
generating a third data set responsive to the new command.

17. A device comprising:
a microcontroller unit;
a memory module coupled to the microcontroller unit; and
a voltage regulator coupled to the microcontroller unit and the memory module, the voltage regulator comprising:
a processor;
a register bank coupled to the processor; and
a logic block coupled to the processor and to the register bank, the logic block includes a frame decision maker, a first decoder and a second decoder, the frame decision maker configured to receive frames and configured to generate an interpret frame from a first one of the frames, and the processor, based on the interpret frame, configured to:
activate a set of protocol registers storing protocol information corresponding to one of a first protocol or a second protocol;
enable configuration settings in the register bank corresponding to one of the first protocol or the second protocol; and
enable one of the first decoder and the second decoder to decode a command in the first frame, wherein each of the first decoder and the second decoder are configurable to decode a frame compliant with the first protocol and a frame compliant with the second protocol for high speed serial interface (HSSI).

\* \* \* \* \*